United States Patent
Yang et al.

(10) Patent No.: US 12,155,214 B2
(45) Date of Patent: Nov. 26, 2024

(54) PHOTOVOLTAIC ENERGY STORAGE OFFLINE COORDINATION SYSTEM AND METHOD BASED ON DEMAND MANAGEMENT

(71) Applicant: STATE GRID ZHEJIANG ELECTRIC POWER CO., LTD. TAIZHOU POWER SUPPLY COMPANY, Zhejiang (CN)

(72) Inventors: Jian Yang, Zhejiang (CN); Zhijian Yu, Zhejiang (CN); Xinjian Chen, Zhejiang (CN); Dongbo Zhang, Zhejiang (CN); Jie Yu, Zhejiang (CN); Chenghuai Hong, Zhejiang (CN); Zihuai Zheng, Zhejiang (CN); Yuxi Tu, Zhejiang (CN); Lintong Wang, Zhejiang (CN); Weiming Lu, Zhejiang (CN); Qinye Chen, Zhejiang (CN); Zi Ying, Zhejiang (CN); Yizhi Zhu, Zhejiang (CN)

(73) Assignee: STATE GRID ZHEJIANG ELECTRIC POWER CO., LTD. TAIZHOU POWER SUPPLY COMPANY, Taizhou (CN)

( * ) Notice: Subject to any disclaimer, the term of this patent is extended or adjusted under 35 U.S.C. 154(b) by 76 days.

(21) Appl. No.: 17/765,013

(22) PCT Filed: Jan. 21, 2022

(86) PCT No.: PCT/CN2022/073162
§ 371 (c)(1),
(2) Date: Mar. 30, 2022

(87) PCT Pub. No.: WO2023/040161
PCT Pub. Date: Mar. 23, 2023

(65) Prior Publication Data
US 2024/0088667 A1 Mar. 14, 2024

(30) Foreign Application Priority Data

Sep. 17, 2021 (CN) .......................... 202111090351.2

(51) Int. Cl.
*H02J 3/38* (2006.01)
*H02J 13/00* (2006.01)

(52) U.S. Cl.
CPC ........ *H02J 3/381* (2013.01); *H02J 13/00002* (2020.01); *H02J 2300/24* (2020.01)

(58) Field of Classification Search
CPC ... H02J 3/381; H02J 13/00002; H02J 2300/24
USPC ........................................................ 307/52
See application file for complete search history.

(56) References Cited

FOREIGN PATENT DOCUMENTS

| CN | 102427249 A | | 4/2012 |
| CN | 106505551 A | * | 3/2017 |
| CN | 111799880 A | | 10/2020 |

* cited by examiner

*Primary Examiner* — Hal Kaplan

(57) ABSTRACT

Disclosed are a photovoltaic energy storage offline coordination system and method based on demand management. The system includes a photovoltaic generator set, an inverter, a dispatch and control device for charge-discharge, a load monitor, a first and second energy storage device, and a remote console. The photovoltaic generator set is electrically connected to the dispatch and control device for charge-discharge via the inverter; the first energy storage device is connected to a load-side power supply bus via a first dispatch and control unit; the second energy storage device is connected to the load-side power supply bus via a third dispatch and control unit; a second dispatch and control unit is connected to the load-side power supply bus; the load monitor is provided at the load-side power supply bus, and configured to monitor a load of the load-side.

6 Claims, 5 Drawing Sheets

PHOTOVOLTAIC ENERGY STORAGE OFFLINE COORDINATION SYSTEM AND METHOD BASED ON DEMAND MANAGEMENT

FIELD OF THE TECHNOLOGY

This application relates to the field of new energy dispatch and control technologies, and specifically to a photovoltaic energy storage offline coordination system and method based on demand management.

BACKGROUND OF THE DISCLOSURE

As energy storage technologies advance and new energy sources integrate into grids in a large-scale manner, it is necessary to strengthen a clean energy consumption capacity of a modern electrical grids, optimize an operational cost, and break through a traditional operational mode. The large-scale integration of renewable energy sources into the grids effectively alleviates China's energy dilemma, but it inevitably affects traditional grids, such as increasing a peak-to-valley difference of a system, affecting stability of the system, etc. Therefore, expanding application scenarios of a distributed energy storage system and strengthening coordinated and optimized operation with new energy is an inevitable trend.

An existing energy storage system has a relatively simple operational mode, which lacks optimized control for multiple time scales. In addition, as sensor technologies and network security technologies develop, intelligent dispatch and control technologies have been used for issuance and execution of dispatch and control instructions. However, there exist problems, such as being untimely, unsafe and inaccurate, when issuing the dispatch and control instructions in the related art.

SUMMARY

In view of the problems that the energy storage systems in large industrial parks operate in a single mode of peak shaving and valley filling, and the coordinated dispatch and control instructions are issued untimely, unsafely and inaccurately, the present disclosure provides a photovoltaic energy storage offline coordination system and method based on demand management, which can select different dispatch and control strategies according to different load demand periods, and enable a dedicated transmission channel to send and receive information, so as to ensure transmission safety of dispatch and control instructions, thereby ensuring safe and stable operation of power lines.

According to an aspect, the present disclosure provides a photovoltaic energy storage offline coordination system based on demand management, including a photovoltaic generator set, an inverter, a dispatch and control device for charge-discharge, a load monitor, a first energy storage device, a second energy storage device, and a remote console. The photovoltaic generator set is electrically connected to the dispatch and control device for charge-discharge via the inverter; the first energy storage device is connected to a load-side power supply bus via a first dispatch and control unit in the dispatch and control device for charge-discharge; the second energy storage device is connected to the load-side power supply bus via a third dispatch and control unit in the dispatch and control device for charge-discharge; a second dispatch and control unit in the dispatch and control device for charge-discharge is connected to the load-side power supply bus; the load monitor is provided at the load-side power supply bus, and configured to monitor a load of the load-side; and the remote console, the load monitor, and the dispatch and control device for charge-discharge are communicatively connected with one another.

In this embodiment, the remote console and the charge-discharge controller respectively obtain detection information of the load monitor, obtain a load demand period according to the detection information, so as to enable a dedicated channel to realize information interaction between the remote console and the charge-discharge controller. The remote console obtains a dispatch and control instruction by using a lookup table according to the load demand period, and sends the dispatch and control instruction to the dispatch and control device for charge-discharge through the dedicated channel, so as to execute specific dispatch and control measures.

Optionally, the dispatch and control device for charge-discharge and the remote console each is provided with a channel decoder, the channel decoder being configured to fuse a dedicated channel according to a load demand characteristic, to realize information interaction between the dispatch and control device for charge-discharge and the remote console; the load monitor is configured to divide a load demand period into a peak I stage, a peak II stage, a flat stage, a valley I stage, and a valley II stage according to a demand characteristic of the load for an electric power; the remote console and the dispatch and control device for charge-discharge each is provided with a dispatch and control instruction table and decoding instructions corresponds to dispatch and control instructions in the dispatch and control instruction table according to the load demand period; and the channel decoder is configured to obtain a corresponding dedicated channel number according to a decoding instruction, and enable a channel corresponding to the dedicated channel number as a dedicated channel for communication.

In this embodiment, the load demand period is divided according to a ratio of a load electric power to an active power of the photovoltaic generator set. A specific division principle is set according to an upper limit of a safe power level when the load is operating normally. The channel decoder enables the dedicated channel according to a specific dispatch and control instruction, which realizes one-way information transmission, without causing packet loss or information congestion, thereby ensuring information security.

Optionally, the dispatch and control device for charge-discharge and the remote console each is provided with a pointer register. The pointer register is provided with decoding instruction storage bits, the decoding instruction storage bits being configured for storing the decoding instruction in a format of binary encoding, and the decoding instruction stored in the decoding instruction storage bits is mapped with the dedicated channel enabled by the channel decoder.

In this embodiment, according to a decoding rule, a binary string formed by the binary encoded information stored in the decoding instruction storage bits may be converted into a decimal number, so that a dedicated channel number is determine, and then a channel with the corresponding dedicated channel number is enabled, thereby realizing the customization of the dedicated channel.

Optionally, a setting rule of the binary encoding is as follows:

the first dispatch and control unit, the second dispatch and control unit, and the third dispatch and control unit each is configured to have any one of a "charge" state, a "discharge" state, and a "no action" state according to a dispatch and control state;

the "charge" state corresponds to a binary code "01", the "discharge" state corresponds to a binary code "10", and the "no action" state corresponds to a binary code "00";

the decoding instruction is determined according to a binary string formed by the binary codes, and the corresponding dedicated channel number is mapped according to the decoding instruction, to enable the dedicated channel for communication.

Optionally, a logic of setting the dispatch and control instruction in the dispatch and control instruction table according to the load demand period is as follows:

in a case that the load demand period is the peak I stage, a dispatch and control state of the first dispatch and control unit is "discharge", a dispatch and control state of the second dispatch and control unit is "no action", and a dispatch and control state of the third dispatch and control unit is "discharge"; and a corresponding binary string is "10 00 10"; in a case that the load demand period is the peak II stage, a dispatch and control state of the first dispatch and control unit is "discharge", a dispatch and control state of the second dispatch and control unit is "discharge", and a dispatch and control state of the third dispatch and control unit is "discharge"; and a corresponding binary string is "10 10 10"; in a case that the load demand period is the flat stage, a dispatch and control state of the first dispatch and control unit is "no action", a dispatch and control state of the second dispatch and control unit is "no action", and a dispatch and control state of the third dispatch and control unit is "discharge"; and a corresponding binary string is "00 00 10"; in a case that the load demand period is the valley I stage, the dispatch and control state of the first dispatch and control unit is "charge", the dispatch and control state of the second dispatch and control unit is "no action", and the dispatch and control state of the third dispatch and control unit is "discharge"; the corresponding binary string is "01 00 10"; and in a case that the load demand period is the valley II stage, a dispatch and control state of the first dispatch and control unit is "charge", a dispatch and control state of the second dispatch and control unit is "charge", and a dispatch and control state of the third dispatch and control unit is "discharge"; and a corresponding binary string is "01 01 10".

According to another aspect, the present disclosure provides a photovoltaic energy storage offline coordination method based on demand management, including:

S1. respectively obtaining, by a dispatch and control device for charge-discharge and a remote console, load electric power information acquired by a load monitor, and determining a load demand period according to a ratio of a load electric power to an active power of a photovoltaic generator set;

S2. after determining the load demand period, obtaining, by the dispatch and control device for charge-discharge, a dedicated channel number of a channel decoder according to a decoding instruction corresponding to a dispatch and control instruction in a dispatch and control instruction table, and enabling a dedicated channel corresponding to the dedicated channel number as a dedicated receiving channel;

synchronously obtaining, by the remote console, a dedicated channel number of a channel decoder according to a decoding instruction corresponding to a dispatch and control instruction in a dispatch and control instruction table, and enabling the dedicated channel as a dedicated sending channel;

S3. encrypting, by the remote console, the dispatch and control instruction by asymmetric encryption, and sending an encrypted dispatch and control instruction to a receiving end of the dispatch and control device for charge-discharge through the dedicated sending channel; and S4. obtaining, by the dispatch and control device for charge-discharge, the encrypted dispatch and control instruction through the dedicated receiving channel, decrypting the encrypted dispatch and control instruction, and performing a corresponding dispatch and control strategy according to a decrypted dispatch and control instruction.

The present disclosure has at least the following beneficial effects.

1. The photovoltaic energy storage offline coordination system and method based on demand management provided by the present disclosure adopt a layered mode. A lower layer includes local running devices (i.e., the photovoltaic generator set, the first energy storage device, the second energy storage device, and the inverter); a middle layer includes network communication and links (i.e., the channel decoders); and an upper layer is a display and monitoring layer (i.e., the charge-discharge controller, the remote console, and the load monitor). This can effectively realize comprehensive monitoring of the photovoltaic generator set, the energy storage devices and the load in a park, which contributes to arrangement of safe production activities in the park.

2. The present disclosure, based on regional peak and valley electricity prices and new energy consumption, designs an autonomous operation control strategy for peak shaving and valley filling. According to an actual production situation in the park combined with a power fluctuation of the load, different operation strategies are formulated for different types and capacities of energy storage, to help balance supply and demand during peak and valley periods in the park, thereby improving safety, reliability, and economy of grid operations.

3. The present disclosure considers the autonomous operation (peak shaving and valley filling) of the park and safety characteristics of energy storage charge and discharge, which effectively reduces a peak power of users, thereby reducing a demand charge and a capacity charge.

Figure 1:
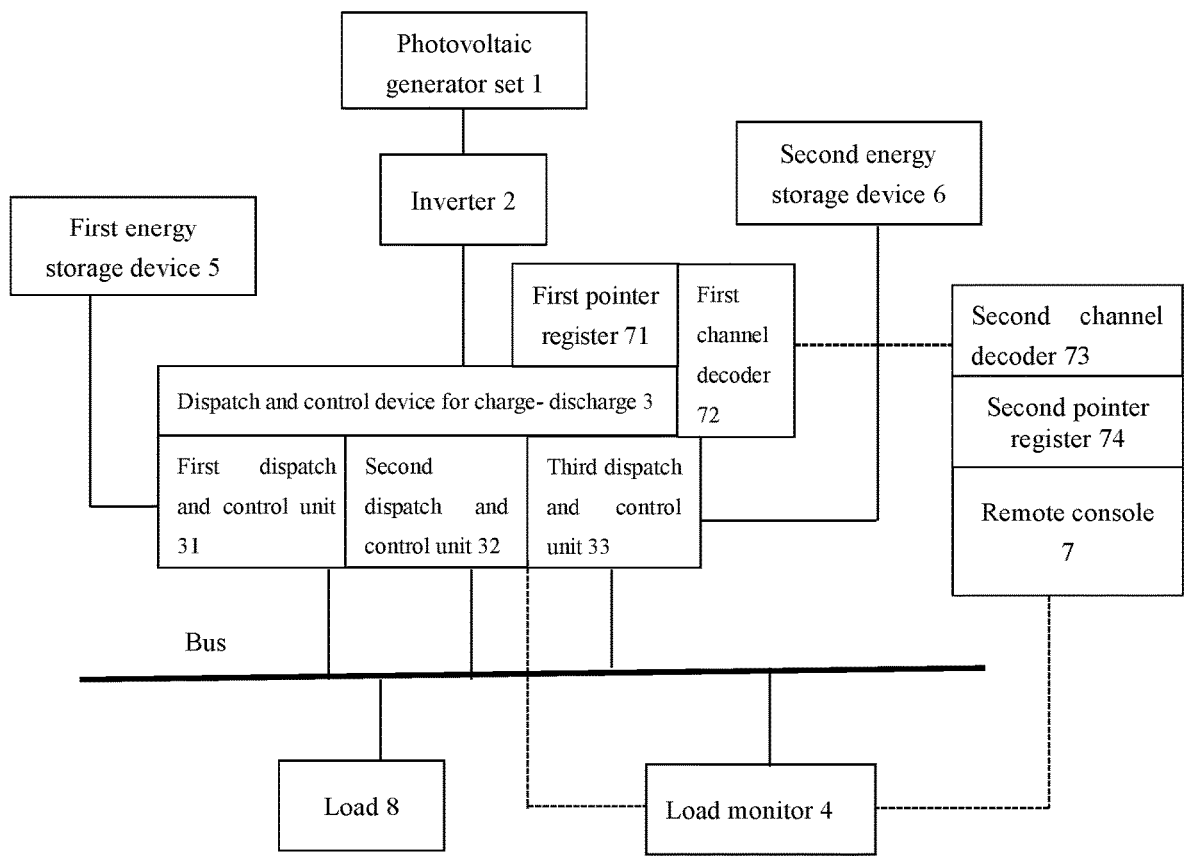
FIG. 1 is a schematic structural diagram showing a photovoltaic energy storage offline coordination system based on demand management according to an embodiment of the present disclosure.

In the drawings: 1—photovoltaic generator set, 2—inverter, 3—dispatch and control device for charge-discharge, 4—load monitor, 5—first energy storage device, 6—second energy storage device, 7—remote console, 8—load, 31—first dispatch and control unit, 32—second dispatch and control unit, 33—third dispatch and control unit, 71—first pointer register, 72—first channel decoder, 73—second channel decoder, 74—second pointer register.

DESCRIPTION OF EMBODIMENTS

To make the objectives, technical solutions, and advantages of the embodiments of the present disclosure clearer, the technical solutions according to the embodiments of the present disclosure are described below with reference to the accompanying drawing. The described embodiments are merely some rather than all of the embodiments of the present disclosure. Based on the embodiments of the present disclosure, all other embodiments obtained by those of ordinary skill in the art without creative efforts shall fall within the protection scope of the present disclosure.

Embodiments: As shown in FIG. 1, a photovoltaic energy storage offline coordination system based on demand management includes a photovoltaic generator set 1, an inverter 2, a dispatch and control device for charge-discharge 3, a load monitor 4, a first energy storage device 5, a second energy storage device 6, and a remote console 7. The photovoltaic generator set 1 is electrically connected to the dispatch and control device for charge-discharge 3 via the inverter 2. The first energy storage device 5 is connected to a load-side power supply bus via the first dispatch and control unit 31 in the dispatch and control device for charge-discharge 3. The second energy storage device 6 is connected to the load-side power supply bus via the third dispatch and control unit 33 in the dispatch and control device for charge-discharge 3. The second dispatch and control unit 32 in the dispatch and control device for charge-discharge 3 is connected to the load-side power supply bus. The load monitor 4 is arranged at the load-side power supply bus, and configured to monitor a load of the load 8 side. The remote console 7, the load monitor 4, and the dispatch and control device for charge-discharge 3 are communicatively connected with one another.

In this embodiment, the remote console 7 and the charge-discharge controller 3 respectively obtain detection information of the load monitor 4, obtain a load demand period according to the detection information, so as to enable a dedicated channel to realize information interaction between the remote console 7 and the charge-discharge controller 3. The remote console 7 obtains a dispatch and control instruction by using a lookup table according to the load demand period, and sends the dispatch and control instruction to the dispatch and control device for charge-discharge 3 through the dedicated channel, so as to execute specific dispatch and control measures.

The dispatch and control device for charge-discharge 3 and the remote console 7 each is provided with a channel decoder, specifically including a first channel decoder 72 provided at the dispatch and control device for charge-discharge and a second channel decoder 73 provided at the remote console. The channel decoder fuses the dedicated channel according to a load demand characteristic, to realize the information interaction between the dispatch and control device for charge-discharge and the remote console. The load monitor 4 is configured to divide the load demand period into a peak I stage, a peak II stage, a flat stage, a valley I stage, and a valley II stage according to a demand characteristic of the load for an electric power. The remote console 7 and the dispatch and control device for charge-discharge 3 each is provided with a dispatch and control instruction table and decoding instructions corresponding to dispatch and control instructions in the dispatch and control instruction table according to the load demand period. The channel decoder obtains a corresponding dedicated channel number according to a decoding instruction, and enables a channel corresponding to the dedicated channel number as a communication dedicated channel. The load demand period is divided according to a ratio of the load electric power to an active power of the photovoltaic generator set. A specific division principle is set according to an upper limit of a safe power level when the load is operating normally. The channel decoder enables the dedicated channel according to a specific dispatch and control instruction, which realizes one-way information transmission, without causing packet loss or information congestion, thereby ensuring information security.

The dispatch and control device for charge-discharge 3 and the remote console 7 each is provided with a pointer register, specifically including a first pointer register 71 provided at the dispatch and control device for charge-discharge and a second pointer register 74 provided at the remote console. The pointer register is provided with decoding instruction storage bits. The decoding instruction storage bits are configured for storing a decoding instruction in a format of binary encoding. The decoding instruction stored in the decoding instruction storage bits is mapped with the dedicated channel enabled by the channel decoder.

According to a decoding rule, a binary string constituted by the binary encoded information stored in the decoding instruction storage bits may be converted into a decimal number, so that a dedicated channel number is determined, and then a channel with the corresponding dedicated channel number is enabled, thereby realizing the customization of the dedicated channel.

A setting rule of the binary encoding is as follows.

The first dispatch and control unit 31, the second dispatch and control unit 32, and the third dispatch and control unit 33 each is configured to have any one of a "charge" state, a "discharge" state, and a "no action" state according to a dispatch and control state.

The "charge" state corresponds to a binary code "01", the "discharge" state corresponds to a binary code "10", and the "no action" state corresponds to a binary code "00".

The decoding instruction is determined according to a binary string formed by the binary codes, and the corresponding dedicated channel number is mapped according to the decoding instruction, so as to enable the dedicated channel for communication.

A logic of setting the dispatch and control instruction in the dispatch and control instruction table according to the load demand period is as follows:

When the load demand period is the peak I stage, the dispatch and control state of the first dispatch and control unit is "discharge", the dispatch and control state of the second dispatch and control unit is "no action", and the dispatch and control state of the third dispatch and control unit is "discharge"; the corresponding binary string is "10 00 10"; and the corresponding dedicated channel number is $2^5+2=34$.

When the load demand period is the peak II stage, the dispatch and control state of the first dispatch and control unit is "discharge", the dispatch and control state of the second dispatch and control unit is "discharge", and the dispatch and control state of the third dispatch and control unit is "discharge"; the corresponding binary string is "10 10 10"; and the corresponding dedicated channel number is $2^5+2^3+2=42$.

When the load demand period is the flat stage, the dispatch and control state of the first dispatch and control unit is "no action", the dispatch and control state of the second dispatch and control unit is "no action", and the dispatch and control state of the third dispatch and control unit is "discharge"; the corresponding binary string is "00 00 10"; and the corresponding dedicated channel number is $2^1=2$.

When the load demand period is the valley I stage, the dispatch and control state of the first dispatch and control unit is "charge", the dispatch and control state of the second dispatch and control unit is "no action", and the dispatch and control state of the third dispatch and control unit is "discharge"; the corresponding binary string is "01 00 10"; and the corresponding dedicated channel number is $2^4+2=18$.

When the load demand period is the valley II stage, the dispatch and control state of the first dispatch and control unit is "charge", the dispatch and control state of the second dispatch and control unit is "charge", and the dispatch and control state of the third dispatch and control unit is "discharge"; the corresponding binary string is "01 01 10"; and the corresponding dedicated channel number is $2^4+2^2+2=22$.

In an embodiment, the present disclosure also provides a photovoltaic energy storage offline coordination method based on demand management, including the following steps:

S1. The dispatch and control device for charge-discharge and the remote console respectively obtain load electric power information acquired by the load monitor, and determine a load demand period according to a ratio of a load electric power to an active power of the photovoltaic generator set.

S2. After the load demand period is determined, the dispatch and control device for charge-discharge obtains a dedicated channel number of the channel decoder according to a decoding instruction corresponding to a dispatch and control instruction in the dispatch and control instruction table (a total of $2^6=64$ dedicated channels), and enables a dedicated channel corresponding to the dedicated channel number as a dedicated receiving channel. Synchronously, the remote console obtains a dedicated channel number of the channel decoder according to a decoding instruction corresponding to a dispatch and control instruction in the dispatch and control instruction table, and enables the dedicated channel as a dedicated sending channel.

S3. After the remote console encrypts the dispatch and control instruction by asymmetric encryption, and sends an encrypted dispatch and control instruction to a receiving end of the dispatch and control device for charge-discharge through the dedicated sending channel.

S4. The dispatch and control device for charge-discharge obtains the encrypted dispatch and control instruction through the dedicated receiving channel, decrypts the obtained encrypted dispatch and control instruction, and performs a corresponding dispatch and control strategy according to a decrypted dispatch and control instruction.

Peak shaving and valley filling refers to that a user, according to a price difference between peak and valley electricity price, arranges client-side energy storage clusters to discharge at grid peak times, while arranges the client-side energy storage clusters to charge at grid valley times, so as to allow discharge at peak electricity times, thereby reducing an amount of electrical load purchased from the grid at peak electricity times. The peak shaving and valley filling aims at minimizing electricity bills on the premise of ensuring economy of energy storage.

Generally, parameters of the energy storage clusters participating in the peak shaving and valley filling have been determined. In this case, the user usually divides the peak, valley, flat periods only according to a peak-valley electricity price policy, so as to formulate a daily charge-discharge plan with reference to the energy storage parameters, as well as formulate a next day's charge-discharge plan according to types of an energy storage systems and characteristics of each electrochemical cell. For electrochemical cell energy storage systems with the same type, the next day's charge-discharge plan is made based on a capacity of each energy storage system.

Figure 2:
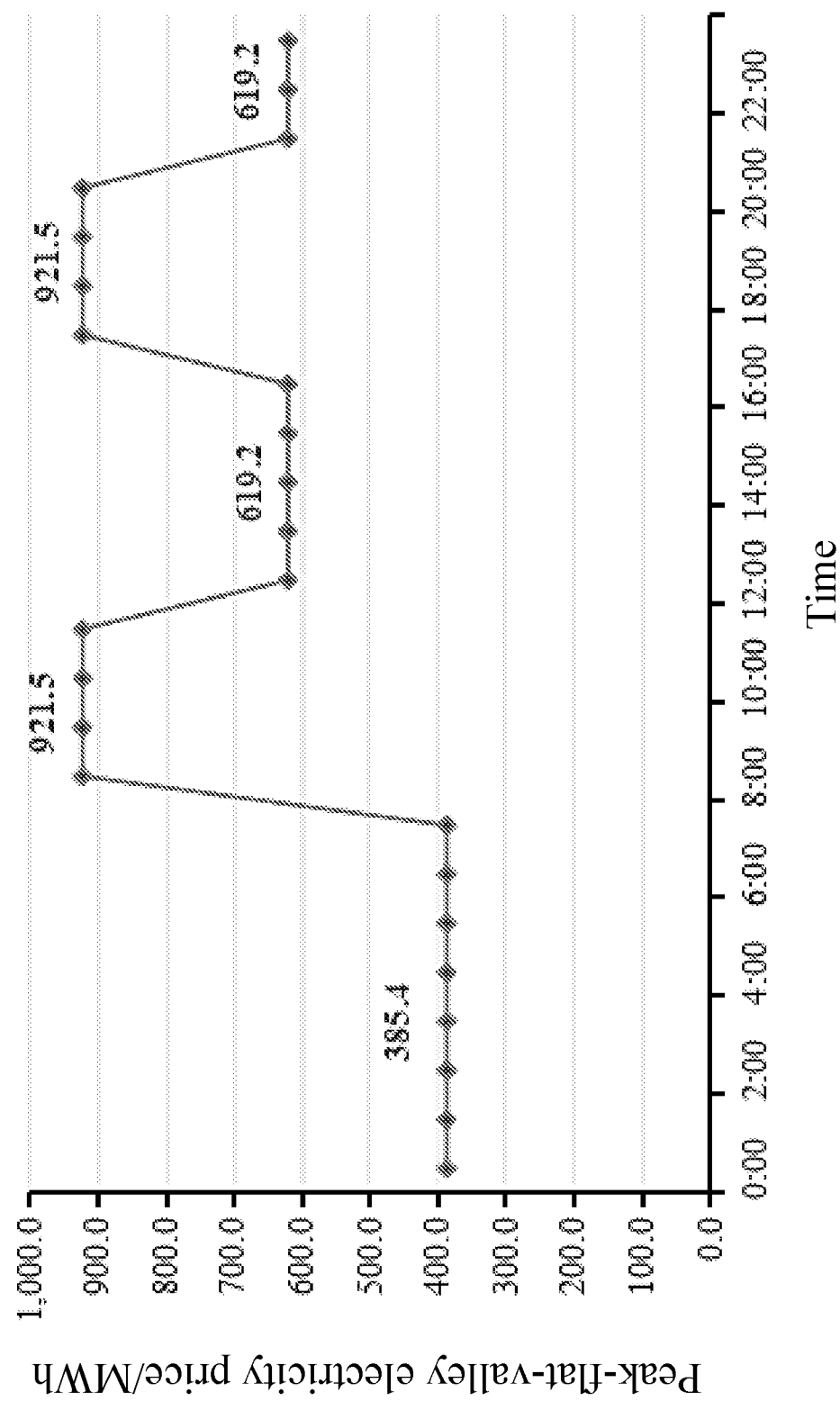
FIG. 2 is a diagram showing electricity price curves in different time zones according to the present disclosure.
Figure 3:
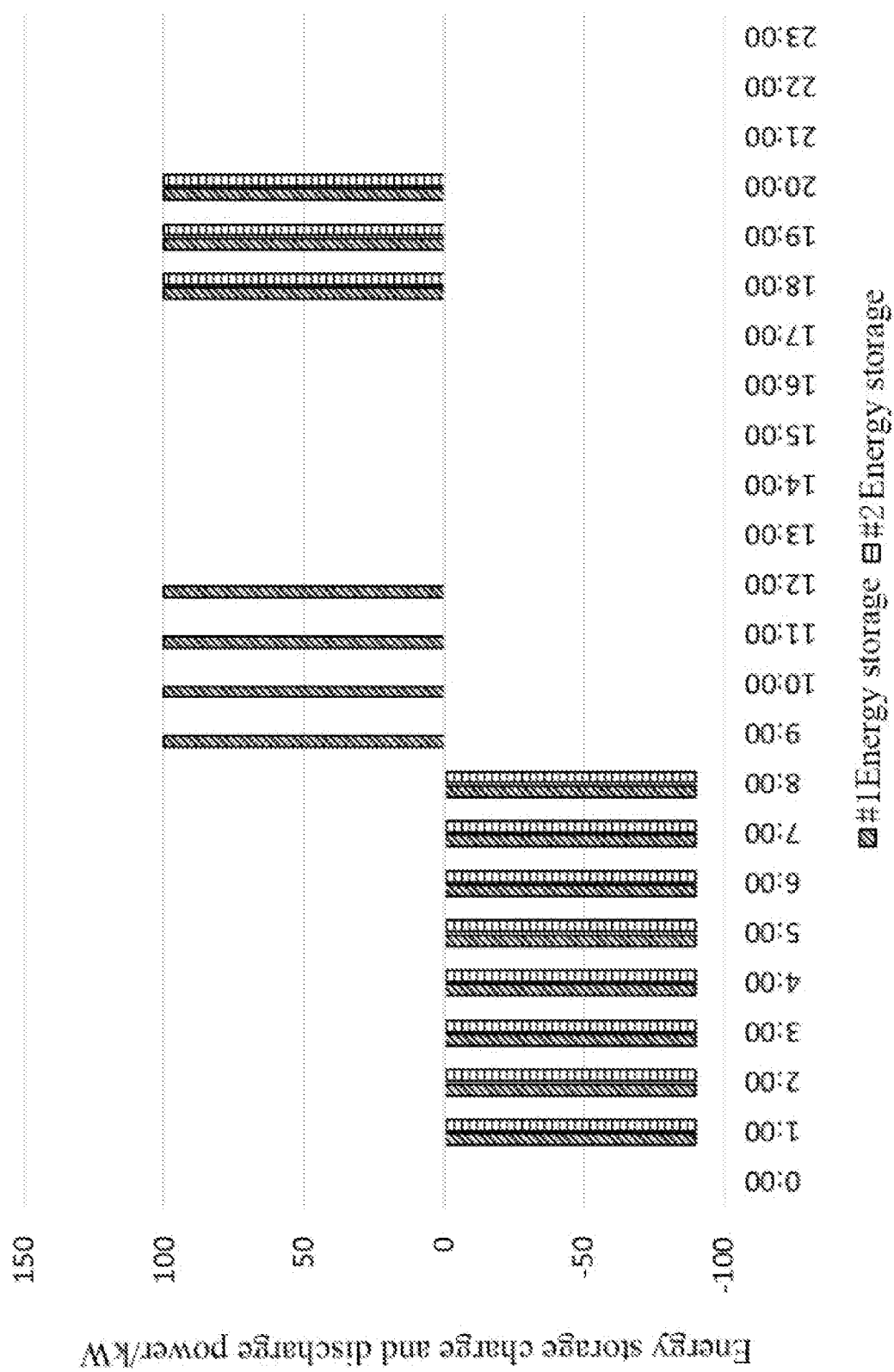
FIG. 3 is a diagram showing charge and discharge curves of energy storage systems according to the present disclosure.

A specific example of a photovoltaic energy storage offline coordination system and method based on demand management is as follows:

The first energy storage device and the second energy storage device are respectively set as a 1 #200 KW/500 kWh energy storage system and a 2 #500 KW/1000 kWh energy storage system. The systems are connected to corresponding branches of a power distribution room in a large industrial park at a voltage level of 400V. A state of charge (SOC) limit of a power station is set in a range from 10 to 90, to prevent a battery from overcharge and overdischarge. As shown in FIG. 2, it shows electricity price curves in different time zones of a grid company. With reference to a local peak-valley electricity price policy combined with of an actual demand for safe production in the industrial park, two sets of energy storage for peak shaving and valley filling control strategies have been formulated. Table 1 shows an operational parameter table of 1 #energy storage, the 1 #energy storage having an operational mode of one charge and two discharges. Table 2 shows an operational parameter table of 2 #energy storage, the 2 #energy storage, with a certain margin to ensure an internal emergency power supply, having an operational mode of one charge and one discharge. FIG. 3 is a diagram showing charge and discharge curves of energy storage systems.

TABLE 1

Operational parameter table of 1#energy storage

| No. | Period | Electricity price period | Energy storage operational mode | Control power |
| --- | --- | --- | --- | --- |
| 0 | 0:00-8:00 | Valley | Charge | 90 kW |
| 1 | 8:00-12:00 | Peak | Discharge | 100 kW |
| 2 | 12:00-17:00 | Flat | Standby | / |
| 3 | 17:00-20:00 | Peak | Discharge | 100 kW |
| 4 | 20:00-24:00 | Flat | Standby | / |

TABLE 2

Operational parameter table of 2#energy storage

| No. | Period | Electricity price period | Energy storage operational mode | Control power |
| --- | --- | --- | --- | --- |
| 0 | 0:00-8:00 | Valley | Charge | 90 kW |
| 1 | 8:00-12:00 | Flat | Standby | / |
| 2 | 12:00-17:00 | Flat | Standby | / |
| 3 | 17:00-20:00 | Peak | Discharge | 100 kW |
| 4 | 20:00-24:00 | Flat | Standby | / |

Figure 5:
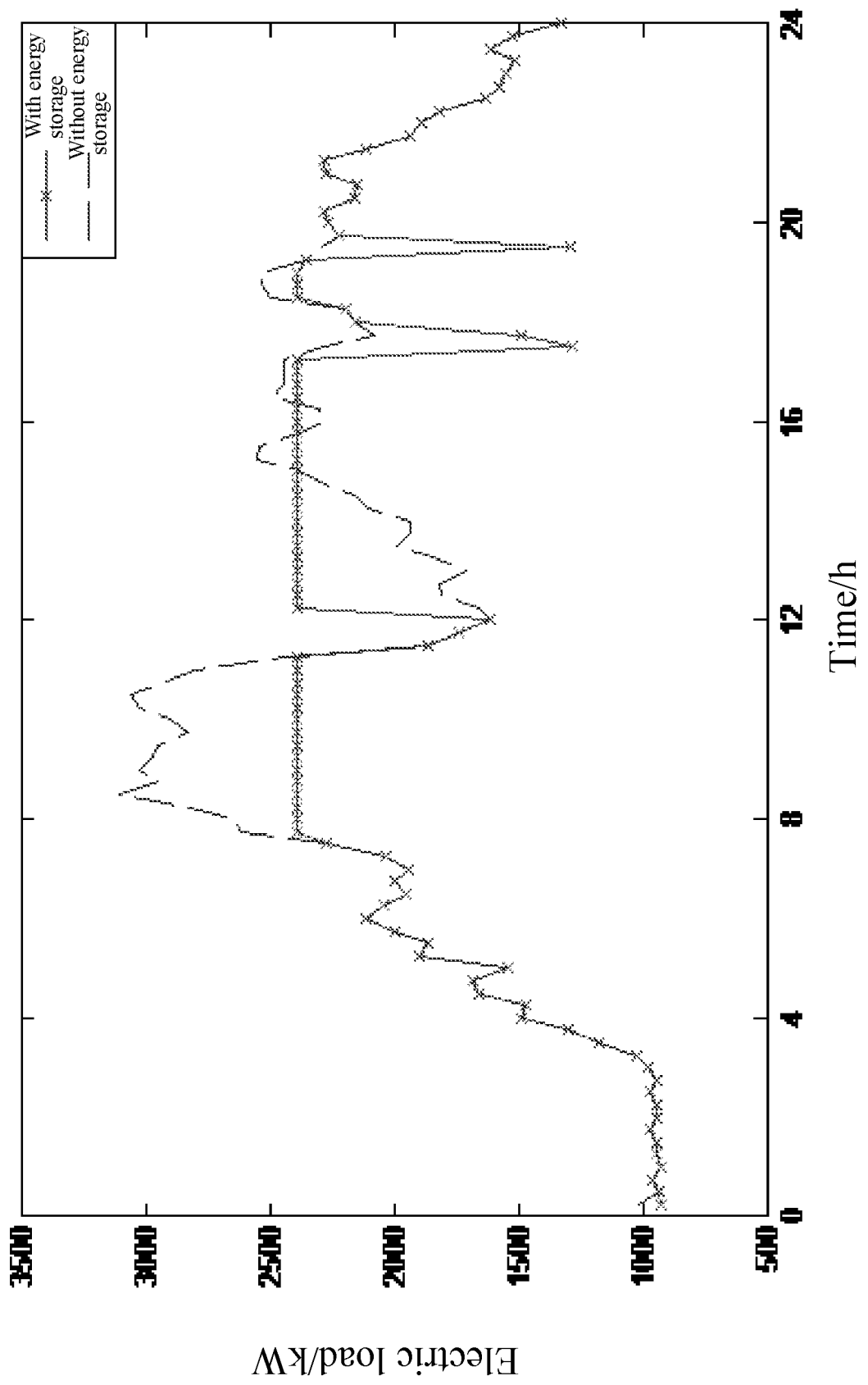
FIG. 5 is a diagram showing effects of energy storage participating in user-side load demand management according to the present disclosure.

A two-part tariff scheme is generally adopted for some large industrial power consumers. The two-part tariff scheme refers to a scheme that combines a basic electricity price corresponding to a capacity and an electricity price corresponding to an amount of electricity consumption to determine an electricity price. In an electricity power market environment, the demand of the electric load may be controlled based on demand management, so as to limit a maximum required power to not exceed a contracted power. This function can be well realized by utilizing an electric power throughput characteristic of energy storage. The energy storage system discharges electricity at the peak electricity times, so as to reduce the peak demand of the industrial large power consumers, thereby reducing the basic electricity charges. FIG. 5 is a diagram showing effects of energy storage participating in user-side load demand management.

Figure 4:
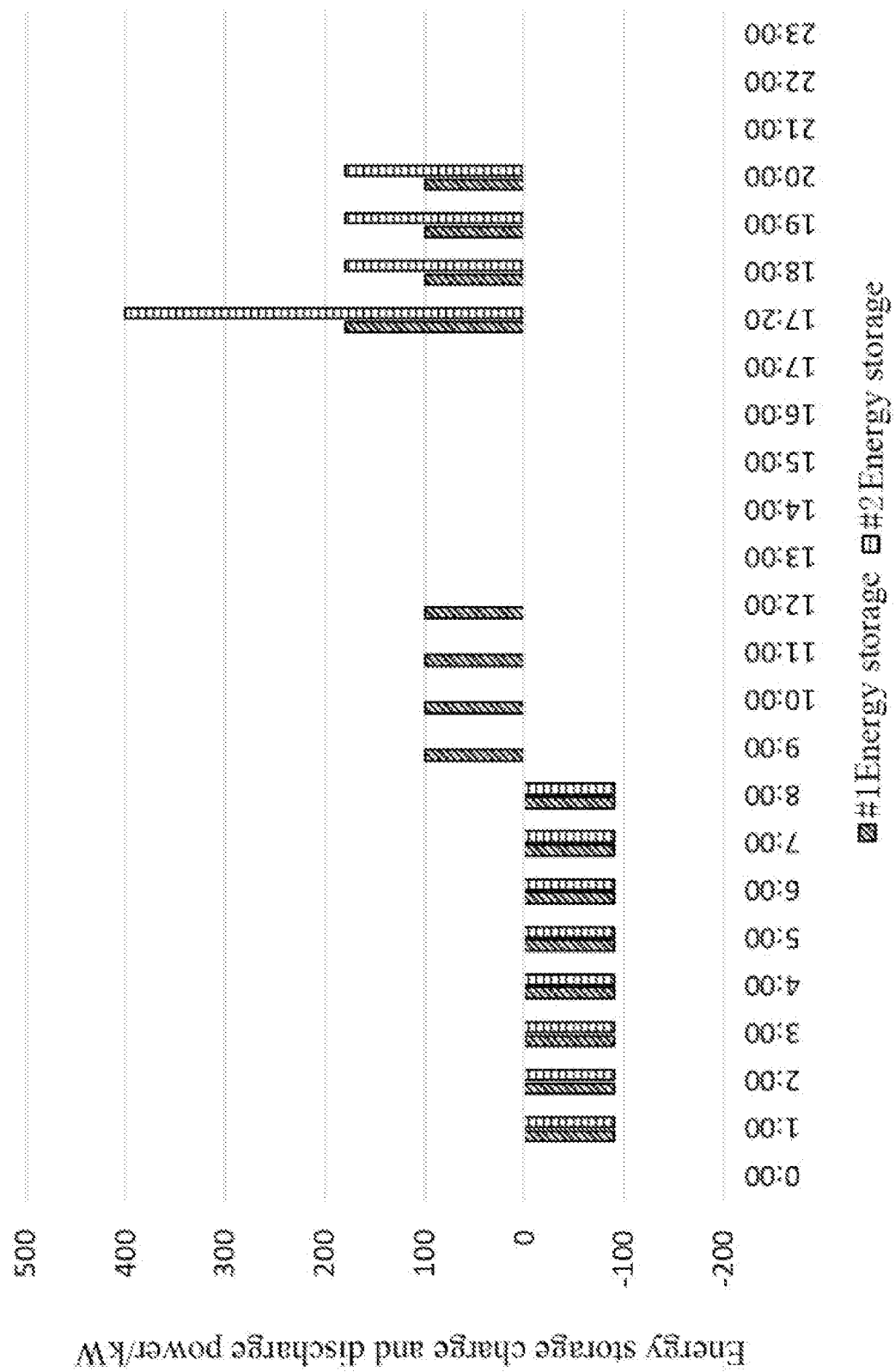
FIG. 4 is a diagram showing daily charge and discharge curves of energy storage systems under energy storage demand management according to the present disclosure.

The 1 #energy storage is set as the operational mode of one charge and two discharges, and 2 #energy storage is set as the operational mode of one charge and one discharge. According to previous research and confirmation with maintenance and operations personnel in the park, a peak demand in this area is 3.8 MW. Considering that the dispatch and control device for charge-discharge triggers dispatch and control after receiving a dispatch and control instruction, the peak demand of an outgoing line from an interconnection point in the park is set to 3.6 MW. Once an outgoing power reaches 3.6 MW, the two sets of energy storage discharge directly no matter what control mode they are in. A discharge power of the 1 #energy storage is set to 180 kW, and a discharge power of the 2 #energy storage is set to 400 kW. After the outgoing power drops, the energy storage systems resume operation in the original mode. Based on the principle of maximization of comprehensive benefits, the energy storage systems operate in the autonomous operation control mode for peak shaving and valley filling. An operation curve of energy storage participating in demand management on a certain day is exported from historical data of a platform. It can be seen that the demand adjustment was triggered at around 17:20, and the energy storage systems began to discharge. As shown in FIG. 4, it is a diagram showing daily charge and discharge curves of energy storage systems under energy storage demand management.

The foregoing specific embodiments are preferred embodiments of the photovoltaic energy storage offline coordination system and method based on demand management according to the present disclosure, and is not intended to limit the specific implementation scope of the present disclosure. The scope of the present disclosure includes but is not limited to the specific embodiments. All equivalent changes made according to the shape and structure of the present disclosure are within the protection scope of the present disclosure.

The invention claimed is:

1. A photovoltaic energy storage offline coordination system based on demand management, comprising a photovoltaic generator set, an inverter, a dispatch and control device for charge-discharge, a load monitor, a first energy storage device, a second energy storage device, and a remote console; wherein:

the photovoltaic generator set is electrically connected to the dispatch and control device for charge-discharge via the inverter; the first energy storage device is connected to a load-side power supply bus via a first dispatch and control unit in the dispatch and control device for charge-discharge; the second energy storage device is connected to the load-side power supply bus via a third dispatch and control unit in the dispatch and control device for charge-discharge; a second dispatch and control unit in the dispatch and control device for charge-discharge is connected to the load-side power supply bus; the load monitor is provided at the load-side power supply bus, and configured to monitor a load of the load-side; and the remote console, the load monitor, and the dispatch and control device for charge-discharge are communicatively connected with one another.

2. The photovoltaic energy storage offline coordination system according to claim 1, wherein:

the dispatch and control device for charge-discharge and the remote console each is provided with a channel decoder, the channel decoder being configured to fuse a dedicated channel according to a load demand characteristic, to realize information interaction between the dispatch and control device for charge-discharge and the remote console; the load monitor is configured to divide a load demand period into a peak I stage, a peak II stage, a flat stage, a valley I stage, and a valley II stage according to a demand characteristic of the load for an electric power; the remote console and the dispatch and control device for charge-discharge each is provided with a dispatch and control instruction table and decoding instructions corresponds to dispatch and control instructions in the dispatch and control instruction table according to the load demand period; and the channel decoder is configured to obtain a corresponding dedicated channel number according to a decoding instruction, and enable a channel corresponding to the dedicated channel number as a dedicated channel for communication.

3. The photovoltaic energy storage offline coordination system according to claim 2, wherein:

the dispatch and control device for charge-discharge and the remote console each is provided with a pointer register, the pointer register being provided with decoding instruction storage bits, the decoding instruction storage bits being configured for storing the decoding instruction in a format of binary encoding, and the decoding instruction stored in the decoding instruction storage bits being mapped with the dedicated channel enabled by the channel decoder.

4. The photovoltaic energy storage offline coordination system according to claim 3, wherein a setting rule of the binary encoding comprises:

the first dispatch and control unit, the second dispatch and control unit, and the third dispatch and control unit each is configured to have any one of a "charge" state, a "discharge" state, and a "no action" state according to a dispatch and control state;

wherein, the "charge" state corresponds to a binary code "01", the "discharge" state corresponds to a binary code "10", and the "no action" state corresponds to a binary code "00";

the decoding instruction is determined according to a binary string formed by the binary codes, and the corresponding dedicated channel number is mapped according to the decoding instruction, to enable the dedicated channel for communication.

5. The photovoltaic energy storage offline coordination system according to claim 2, wherein:

a logic of setting the dispatch and control instruction in the dispatch and control instruction table according to the load demand period is as comprising:

in a case that the load demand period is the peak I stage, a dispatch and control state of the first dispatch and control unit is "discharge", a dispatch and control state of the second dispatch and control unit is "no action", and a dispatch and control state of the third dispatch and control unit is "discharge"; and a corresponding binary string is "10 00 10";

in a case that the load demand period is the peak II stage, a dispatch and control state of the first dispatch and control unit is "discharge", a dispatch and control state of the second dispatch and control unit is "discharge", and a dispatch and control state of the third dispatch and control unit is "discharge"; and a corresponding binary string is "10 10 10";

in a case that the load demand period is the flat stage, a dispatch and control state of the first dispatch and control unit is "no action", a dispatch and control state of the second dispatch and control unit is "no action", and a dispatch and control state of the third dispatch and control unit is "discharge"; and a corresponding binary string is "00 00 10";

in a case that the load demand period is the valley I stage, the dispatch and control state of the first dispatch and control unit is "charge", the dispatch and control state of the second dispatch and control unit is "no action", and the dispatch and control state of the third dispatch and control unit is "discharge"; the corresponding binary string is "01 00 10"; and in a case that the load demand period is the valley II stage, a dispatch and control state of the first dispatch and control unit is "charge", a dispatch and control state of the second dispatch and control unit is "charge", and a dispatch and control state of the third dispatch and control unit is "discharge"; and a corresponding binary string is "01 01 10".

6. A photovoltaic energy storage offline coordination method based on demand management, comprising:
- S1) respectively obtaining, by a dispatch and control device for charge-discharge and a remote console, load electric power information acquired by a load monitor, and determining a load demand period according to a ratio of a load electric power to an active power of a photovoltaic generator set;
- S2) after determining the load demand period, obtaining, by the dispatch and control device for charge-discharge, a dedicated channel number of a channel decoder according to a decoding instruction corresponding to a dispatch and control instruction in a dispatch and control instruction table, and enabling a dedicated channel corresponding to the dedicated channel number as a dedicated receiving channel;

synchronously obtaining, by the remote console, a dedicated channel number of a channel decoder according to a decoding instruction corresponding to a dispatch and control instruction in a dispatch and control instruction table, and enabling the dedicated channel as a dedicated sending channel;
- S3) encrypting, by the remote console, the dispatch and control instruction by asymmetric encryption, and sending an encrypted dispatch and control instruction to a receiving end of the dispatch and control device for charge-discharge through the dedicated sending channel; and
- S4) obtaining, by the dispatch and control device for charge-discharge, the encrypted dispatch and control instruction through the dedicated receiving channel, decrypting the encrypted dispatch and control instruction, and performing a corresponding dispatch and control strategy according to a decrypted dispatch and control instruction.

\* \* \* \* \*